United States Patent [19]

Fujiki

[11] Patent Number: 5,041,991
[45] Date of Patent: Aug. 20, 1991

[54] DATA CONVERSION SYSTEM FOR AN INDUSTRIAL ROBOT SYSTEM

[75] Inventor: Kazuyuki Fujiki, Yokohama, Japan
[73] Assignee: Tokico Ltd., Japan
[21] Appl. No.: 324,254
[22] Filed: Mar. 14, 1989
[30] Foreign Application Priority Data
  Mar. 18, 1988 [JP] Japan .................... 63-65384
[51] Int. Cl.⁵ ............... G05B 13/00; G06F 15/00
[52] U.S. Cl. .................................... 364/513
[58] Field of Search .................... 901/2, 3, 4, 5; 364/192, 513, 502

[56] References Cited

U.S. PATENT DOCUMENTS

| | | | |
|---|---|---|---|
| 4,503,507 | 3/1985 | Takeda et al. | 364/513 |
| 4,604,562 | 8/1986 | Phillips | 364/582 |
| 4,761,745 | 8/1988 | Kodaira | 364/192 |
| 4,817,017 | 3/1989 | Kato | 364/513 |
| 4,833,624 | 5/1989 | Kuwahara et al. | 364/513 |

FOREIGN PATENT DOCUMENTS 0729619 5/1980 U.S.S.R. ..................... 901/3

*Primary Examiner*—Allen R. MacDonald
*Assistant Examiner*—Ayaz R. Sheikh
*Attorney, Agent, or Firm*—Andrus, Sceales, Starke & Sawall

[57] ABSTRACT

A data conversion system for an industrial robot system comprises a first read/write apparatus loaded with a first recording disk recorded with a control data produced by a mother robot and a first scale data specifying a maximum rotational angle and a minimum rotational angle of an arm of the mother robot about a rotational axis, for reading out the control data and the first scale data from the recording disk, a second read/write apparatus loaded with a second recording disk recorded with a second scale data specifying a maximum rotational angle and a minimum rotational angle of an arm about a rotational axis of a duty robot for reading out the second scale data from the second recording disk, and a processor supplied with the control data and first scale data from said first read/write apparatus and further supplied with the second scale data from the second read/write apparatus for modifying the control data in proportion to ratio of the first and second scale data. The converted control data thus obtained is recorded on the second recording disk by the second read/write apparatus.

4 Claims, 4 Drawing Sheets

DATA CONVERSION SYSTEM FOR AN INDUSTRIAL ROBOT SYSTEM

BACKGROUND OF THE INVENTION

The present invention generally relates to industrial robots and more particularly to a data conversion system used in an industrial robot system for feeding a control data to a plurality of robots in an off-line mode.

Conventionally, there is an industrial robot system including a number of robots. In such a robot system, there is a case that each of the robots in the system is required to perform an identical operation. In such a case, a human operator teaches a desired operation to a single robot provided independently from a production line. Such an independent robot is called mother robot. Responsive to the teaching, the mother robot produces a control data specifying its operation and this control data is obtained in a form of a recording medium such as a floppy disk on which the control data is recorded. In correspondence to the number of robots in the production line, a number of floppy disks recorded with the control data are obtained from the mother robot and these floppy disks are loaded on the respective robots in the actual production line called line robots. By doing so, each of the line robots performs the operation which is taught to the mother robot and the human operator can save the time to teach an identical operation to numerous robots in the system.

The control data specifies a rotational angle of an arm of the robot about a number of rotational axes provided in correspondence to articulations in the arm which specifies the degree of freedom of the robot. This number of rotational axes may be six, for example Thus, by controlling the rotation according to the control data, the movement of the arm which the human operator has taught to the mother robot is played back.

In the actual robot system, each robot in the production line usually shows a minute difference in the operation from that of the mother robot, mainly due to the manufacturing error of various part of the robot or due to the error at the time of assembly of the robot. Thus, the actual movement of the arm of the individual robot in the production line is slightly different from that of the arm of the mother robot. Further, the movement of the arm of the robot in the production line is different from one another even when an identical control data is used. Thus, in order to make the movement of the arm of the robot exactly identical to that of the mother robot for all of the robots in the production line, it is necessary to correct the control data for the individual robots in the production line.

Conventionally, such a correction of the control data was performed by the operator at the site of the individual robots when the floppy disk is loaded on a controller of the robot. However, such a correction, made individually for each of the plurality of robots in the production line, is tedious and wastes substantial time. Further, there is a problem in that the production line cannot be started up until the correction for all of the robots in the line is completed when a plurality of robots are used in a single production line. Furthermore, such a manual correction tends to invite error in the operation of the human operator.

SUMMARY OF THE INVENTION

Accordingly, it is a general object of the present invention to provide a novel and useful data conversion system for an industrial robot system including a plurality of robots wherein the problems aforementioned are eliminated.

Another object of the present invention is to provide a data conversion system for an industrial robot system including a plurality of duty robots on a production line for actual operation and a mother robot provided independently from the production line for producing a control data used for controlling the duty robot, wherein the data conversion system comprises a data recording medium for storing a scale data specifying a maximum and minimum rotational angle of an arm of the duty robot about an rotational axis, said data conversion system being loaded with said data recording medium and converting said control data produced by the mother robot to another control data adapted to the duty robot. According to the present invention, it is possible to produce a control data adapted to the individual duty robots immediately after the teaching of the mother robot is completed.

Other objects and further features of the present invention will become apparent from the following detailed description when read in conjunction with the attached drawings.

DETAILED DESCRIPTION

Figure 1:
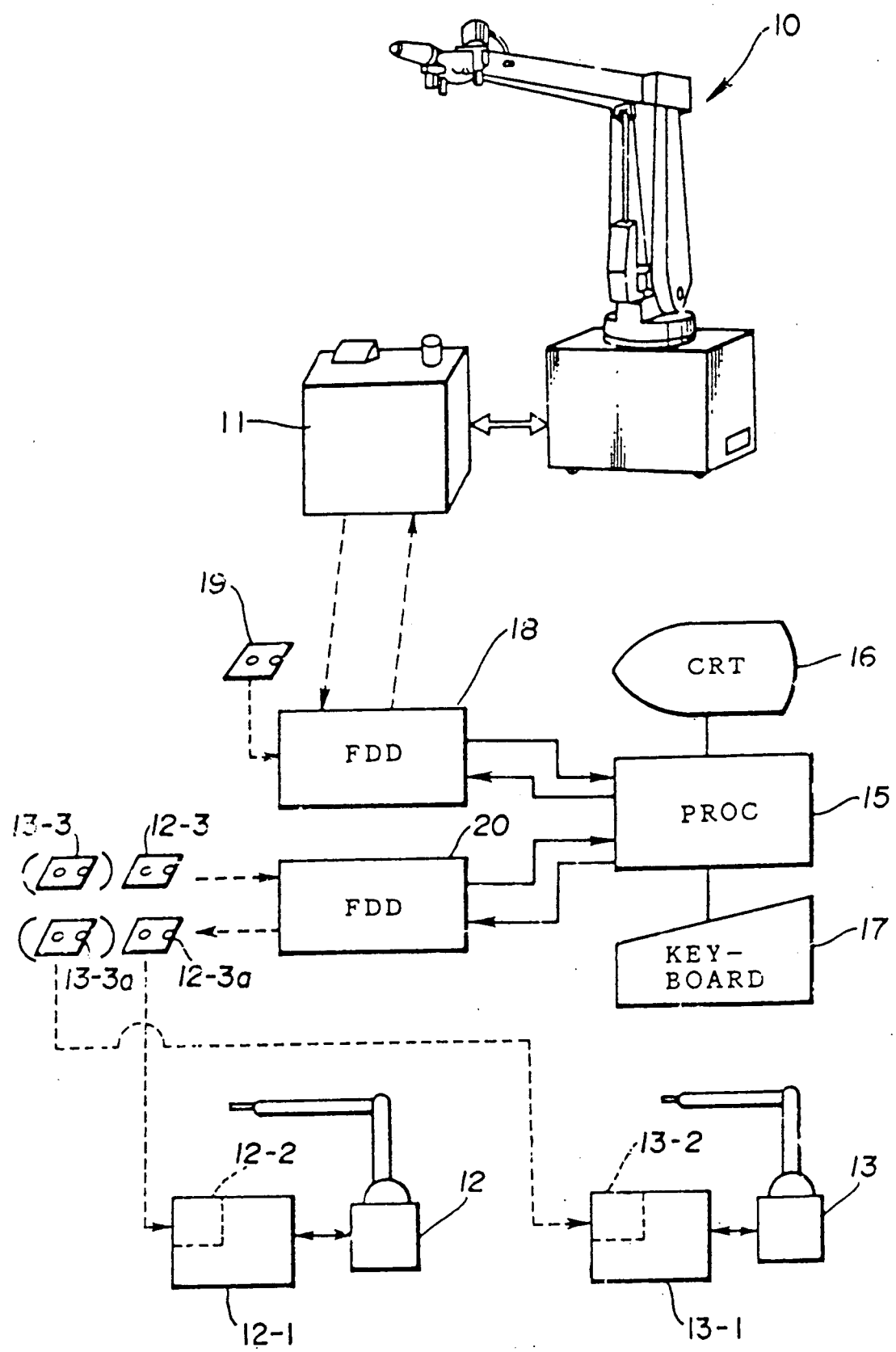
FIG. 1 is a diagram showing an embodiment of the data conversion system of the present invention together with an industrial robot system including a plurality of robots.

FIG. 1 shows the construction of the data conversion system of the present invention together with an overall construction of the industrial robot system in which the data conversion system is used. Referring to the drawing, a mother robot 10 is controlled by a controller 11 and is provided independently from a production line. The mother robot 10 is taught a desired operation by a human operator. In the production line, a plurality of duty robots such as the robot 12 and robot 13 are provided so as to perform an identical operation taught to the mother robot 10 under control of controllers 12-1 and 13-1, respectively. Responsive to the teaching by the operator, the mother robot 10 produces a control data which is taken out from the robot 10 in a form of a floppy disk on which the condole data is recorded.

The data conversion system of the present invention comprises a computer 15, a display 16, a keyboard 17, and a floppy disk drive 19 loaded with a floppy disk 19. The floppy disk 19 is recorded with the control data and the disk drive 18 reads the control data from the floppy disk 19. Further, there is another disk drive 20 which is loaded with another floppy disk 12-3 for the robot 12 or floppy disk 13-3 for the robot 13. The floppy disk 12-3 is defined with a region for storing a converted control data which is a control data adapted to the robot 12. Similarly, the floppy disk 13-3 is defined with a region for storing a converted control data adapted to the robot 13. In the description hereinafter, conversion of the control data performed by the data conversion system will be described only for the robot 12 as the operation of the data conversion system for the robot 13 is identical to that for the robot 12.

The conversion of the control data on the floppy disk 19 to the control data adapted to the robot 12 is started by loading the floppy disks 19 and 12-3 on the floppy disk drives 18 and 20, respectively. Responsive to a starting procedure through the keyboard, the converted control data adapted to the robot 12 is produced on the basis of the control data on the disk 19 as well as on the basis of a scale data and an origin shift data to be described. The scale data and the origin shift data are recorded together with the converted control data on the disk 12-3. The converted control data thus obtained is recorded on the floppy disk 12-3, and the floppy disk thus recorded with the converted control data is designated by a reference numeral of 12-3a. The robot 12 performs the operation which is identical to the operation taught to the mother robot when the floppy disk 12-3a thus obtained is loaded on the floppy disk drive 12-2 in the controller 12-1.

Next, the operation of the data conversion system of the present invention will be described.

1) Preparation

Figure 2A:
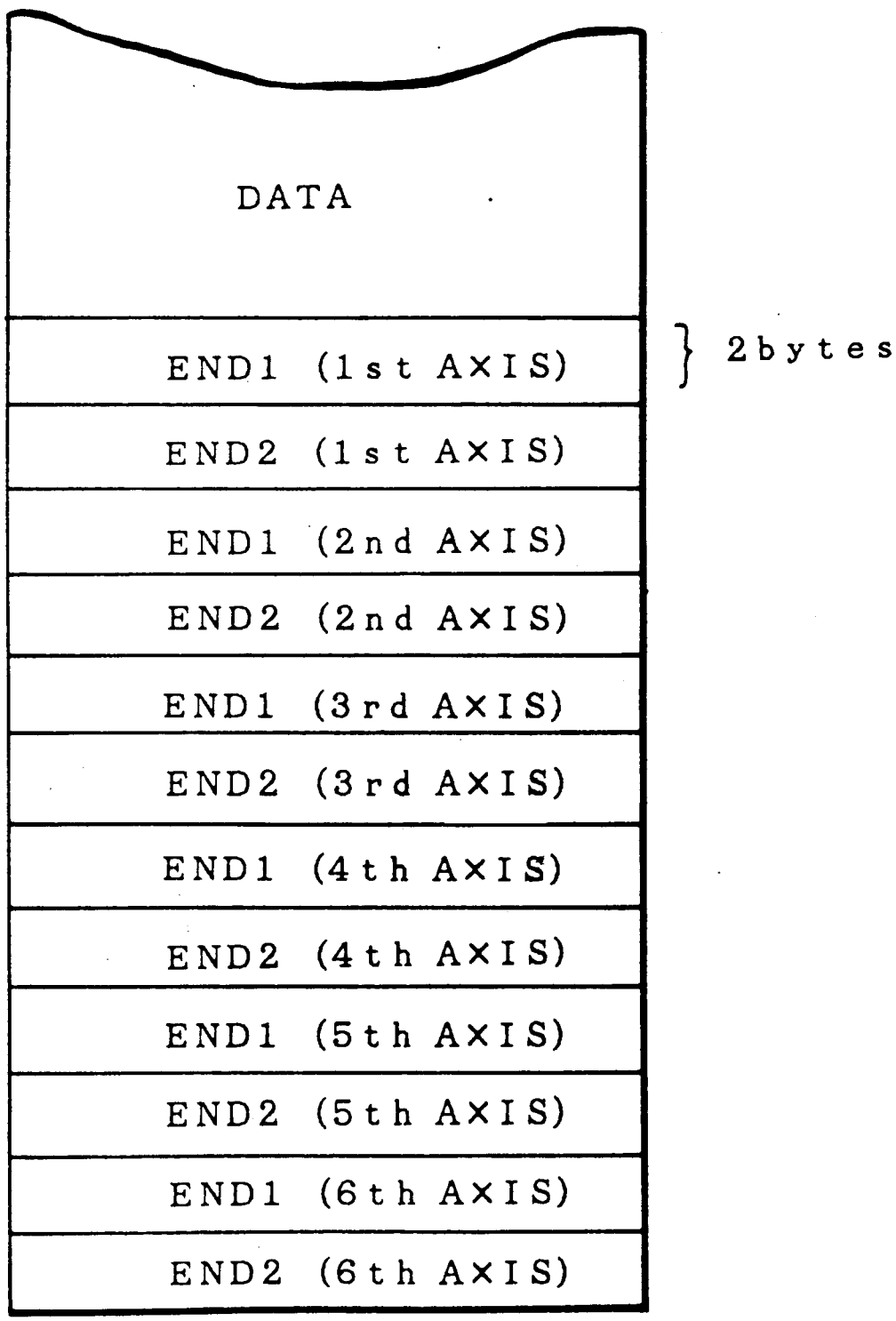
FIGS. 2(A) and 2(B) are diagrams showing a recording format of data files used in the system of FIG. 1 for storing a scale data and an axial shift data for each axis of the robots in a production line.

First, the floppy disk 19 storing the control data of the mother robot is prepared. In this disk 19, a number of control data are recorded in correspondence to a number of teaching points which specify the state of the arm of the mother robot in a form of a rotational angle defining the rotation of the arm of the robot about various axes in the arm of the robot. It should be noted that the arm of a robot comprises a plurality of arm portions connected at a plurality of articulations, and each of the arm portions is rotated about an axis of rotation of such articulations. Further, the disk 19 is recorded with the scale data which specifies the minimum (END1) and maximum (END2) of the rotational angle of the arm or arm portions about the rotational axes of the articulations in the arm of the mother robot 10. FIG. 2(A) shows a part of the disk 19 in which the control data (DATA) and the scale data (END1, END2) are recorded. It should be noted that there are six scale data in correspondence to six rotational axes of the robot, and each scale data occupies two byte region on the disk 19.

Next, the disk 12-3 is prepared such that it has a region called "conversion data file" in which the scale data as well as the origin shift data for the robot 12 is recorded. The scale data is obtained from a value of the maximum and minimum limiting rotational angle obtained in the past for the respective articulations of the robot 12 and is recorded on the disk 12-3. The origin shift data is a data specifying the deviation in the origin of the rotational angle of the arm or arm portion of the duty robot and is inputted through the keyboard 17 responsive to the actual position of the arm of the robot 12.

Figure 2B:
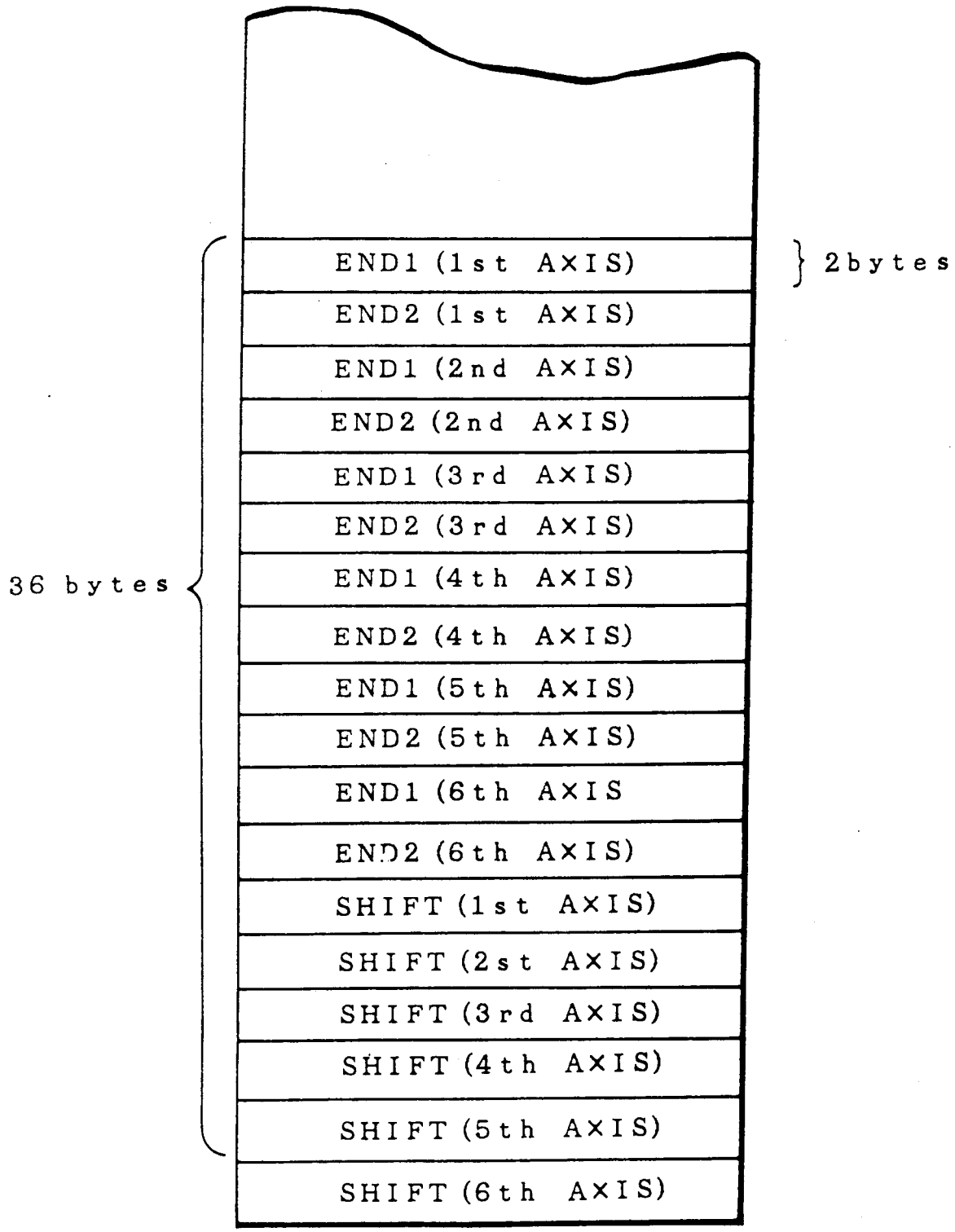

As a result, the disk 12-3 stores the scale data and the axial shift data as illustrated in FIG. 2(B). In the illustrated example, there are six axes of rotation in correspondence to the mother robot, and the minimum rotational angle END1, maximum rotational angle END2, and the deviation in the plane of rotation of the arm about the rotational axes, SHIFT, are stored using two byte data for each of the axes 1–6. Thus, a region of 36 bytes are used for storing these data.

2) Conversion

Figure 3:
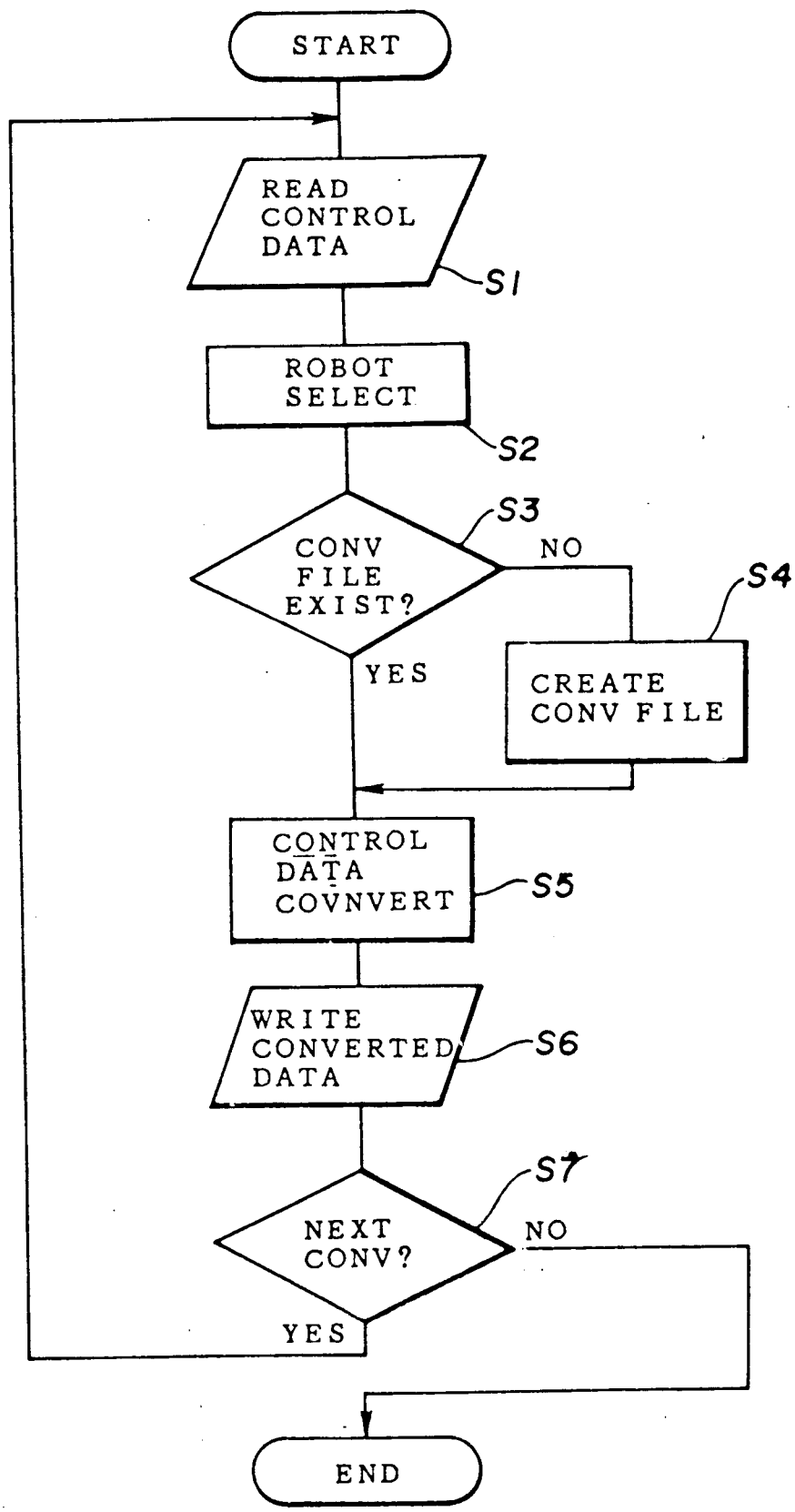
FIG. 3 is a flowchart showing a procedure of data conversion performed by the data conversion system of the present invention.

When the aforementioned preparation is completed, the conversion of the control data is performed in the data conversion system of the present invention using the computer 15 according to the steps shown in FIG. 3.

STEP 1

The control data on the disk 19 loaded on the floppy disk drive 18 is read by the computer 15.

STEP 2

The duty robot for which the conversion of the control data is to be made such as the robot 12 is selected.

STEP 3

It is discriminated if the disk 12-3 loaded on the floppy disk drive 20 is recorded with the scale data and the origin shift data in the aforementioned conversion data file region. If not, it is requested to perform the procedure already described for preparing the data conversion file in the following STEP 4. If yes, the STEP 5 to be described is performed.

STEP 4

In this step, a message such as "PLEASE CREATE CONVERSION DATA FILE" is displayed in the display 16 and the data conversion system waits for the operator to create the conversion data file including the scale data and the axial shift data according to the procedure described in the section of "Preparation".

STEP 5

In this step, the control data for the mother robot 10 read out from the disk 19 is normalized using the scale data, and the correction to the axial shift, which is the deviation in the plane of rotation of the arm or arm portion of the duty robot relative to the plane of rotation of the corresponding arm or arm portion of the mother robot, is applied.

More specifically, a control data DATA(i) representing the rotational angle of the arm of the mother robot 10 about an i-th rotational axis is normalized to a corresponding normalized control data NDATA(i) using a minimum rotational angle END1(i) and a maximum rotational angle END2(i) of the mother robot 10 for the i-th axis as:

$$NDATA(i) = [DATA(i) - END1(i)]/[END2(i) - END1(i)] \times 2^{12}$$

so that the normalized control data NDATA(i) has a maximum of $2^{12}$.

Next, the normalized control data NDATA(i) is converted back to the actual control data or the converted control data DATA(i) for the duty robot 12 according to the following equation:

$$DATA(i) = [NDATA(i) \times (END1(i) - END2(i))]/2^{12} + END1(i)$$

where END1(i) and END2(i) are respectively the minimum and maximum rotational angles about the i-th axis of the duty robot 12 in the production line. In the last equation, the normalized control data is modified proportionally in accordance with the minimum and maximum of the rotational angle of the duty robot 12. It should be noted that this conversion is processed with a maximum resolution of 12 bits which is the maximum possible resolution attained in the memory region of 2 bytes used for the scale data.

Further, the origin in the angular position of the arm of the duty robot 12 is corrected in accordance with the origin shift data by adding or subtracting the origin shift shift data to the converted control data.

STEP 6

The converted control data DATA(i) for the i-th axis is recorded on the disk 12-3. Responsive thereto, the designation of the disk 12-3 is changed to 12-3a indicating the disk on which the converted control data is recorded.

STEP 7

It is discriminated if the conversion of the data is necessary for other duty robots such as the robot 13. If yes, the procedure from the STEP 1 is repeated. If not, the conversion is finished.

As a result of the operations of the data conversion system of the present invention, the control data for the mother robot is converted to the converted control data for the duty robots 12 and 13 used actually in the production line. This conversion is made quite efficiently. By loading the floppy disk such as 12-3a on the floppy disk drive 12-2 of the controller 12-1, the duty robot 12 is operated identically to the mother robot 10 and the difference in the operation in the individual robot is eliminated.

The computer 15, display 16, keyboard 17 and the floppy disk drives 18 and 20 used in the data conversion system may be those used in the controller of the mother robot 10, but these parts may of course be provided separately. Further, it is not necessary to provide two separate floppy disk drives 18 and 20 but they may be used in common.

Further, the present invention is not limited to these embodiments but various variations and modifications may be made without departing from the scope of the invention.

What is claimed is:

1. A data conversion system for an industrial robot system including a other robot having an arm swung about a plurality of rotational axes, said mother robot being taught a desired operation by an operator for producing control data specifying the operation taught by the operator, and a line robot having an arm swung about a plurality of rotational axes corresponding to the rotational axes of the arm of the mother robot, said line robot being supplied with said control data for playing back the operation taught to the mother robot by the operator, said data conversion system comprising:

a first flexible magnetic disk recorded with control data that has been produced by the mother robot and specifying a swinging motion of the arm of the mother robot about each rotational axis thereof and further recorded with first scale data spicing a maximum angle and a minimum angle of the swinging motion of the arm of the mother robot about each rotational axis of the mother robot;

a first flexible disk drive loaded with the first flexible magnetic disk for reading out said control data and said first scale data from the first flexible disk;

a second flexible magnetic disk recorded with second scale data specifying a maximum angle and a minimum angle of a swinging motion of the arm of the line robot about each rotational axis of the line robot, said second flexible disk being further recorded with axial shift data indicating an origin of the arm of the line robot for each rotational axis;

a second flexible disk drive loaded with the second flexible magnetic disk for reading out said second scale data and said axial shift data from the seconded flexible disk; and processing means supplied with said control data and first scale data from said first flexible disk drive and further supplied with said second scale data and axial shift data from said second flexible disk drive for modifying the control data in accordance with said first and second scale data and the axial shift data to produce converted control data; said processing means further supplying the converted control data to the second flexible disk drive;

wherein said second flexible disk drive records the converted control data thus obtained on said second flexible magnetic disk; and wherein said processing means modifies the control data for an i-th rotational axis of the mother robot into the converted control data first by a normalization process according to an equation $$NDATA(i) = [DATA(i) - END1]/[END1] \times 2^{12}$$

where NDATA(i) is a normalized control data for the i-th rotational axis, DATA(I) is the control data for the i-th rotational axis, and END1 and END2 are the minimum and maximum angles of the i-th rotational axis of the mother robot, and then by a modification of NDATA(i) according to an equation $$NDATA(i) = [NDATA(i) \times (END1 - END2)]/2^{1-2} + END1$$

where NDATA(i) is the converted control data for the i-th rotational axis of the line robot, END1 and END2 are the minimum and maximum angles of the i-th rotational axis of the line robot.

2. A data conversion system as claimed in claim 1 in which said mother robot and line robot have N rotational axes respectively, said first flexible magnetic disk being recorded with the control data and the first scale data for each of the N axes of the mother robot, said second flexible magnetic disk being recorded with the second scale data and the axial shift data for each of the N axes of the line robot, and the processing means performs the modification of the control data for each of the N axes of the mother robot.

3. A data conversion system as claimed in claim 1 in which said first scale data occupies a two byte region on the first flexible magnetic disk, and said second scale data and axial shift data each occupies a two byte region on the second flexible magnetic disk.

4. A data conversion system for an industrial robot system including a mother robot having an arm swung about a plurality of rotational axes, said mother robot being taught a desired operation by an operator for producing control data specifying the operation taught by the operator, and a line robot having an arm swung about a plurality of rotational axes corresponding to the rotational axes of the arm of the mother robot, said line robot being supplied with said control data for playing back the operation taught to the mother robot by the operator, said data conversion system comprising:

a first detachable memory device adapted to be mounted detachably on an input/output device, said first detachable memory device being recorded with control data that has been produced by the mother robot and specifying a swinging motion of the arm of the mother robot about each rotational axis thereof and further recorded with first scale data specifying a maximum angle and a minimum angle of the swinging motion of the arm of the mother robot about each rotational axis of the mother robot;

a first input/output device loaded with the first detachable memory device for reading out said control data and said first scale data from the first detacheable memory device;

a second detachable memory device adapted to be mounted detachably on an input/output device, said second detachable memory device being recorded with second scale data specifying a maximum angle and a minimum angle of a swinging motion of the arm of the line robot about each rotational axis of the line robot, said second detachable memory device being further recorded with axial shift data indicating an origin of the arm of the line robot for each rotational axis;

a second input/output device loaded with the second detachable memory device for reading out said second scale data and said axial shift data from the second detachable memory device; and processing means supplied with said control data and first scale data from said input/output device and further supplied with said second scale data and axial shift data from said second input/output device for modifying the control data in accordance with said first and second scale data and the axial shift data to produce converted control data; said processing means further supplying the converted control data to the second input/output device;

wherein said second input/output device records the converted control data thus obtained on said second detachable memory device; and wherein said processing means modifies the control data for an i-th rotational axis of the mother robot into the converted control data first by a normalization process according to an equation $$NDATA(i) = [DATA(i) - END1]/[END2 - END1] \times 2^{12}$$

where $NDATA(i)$ is a normalized control data for the i-th rotational axis, $DATA(i)$ is the control data for the i-th rotational axis, and $END1$ and $END2$ are the minimum and maximum angles of the i-th rotational axis of the mother robot, and then by a modification of $NDATA(i)$ according to an equation $$NDATA(i) = [NDATA(i) \times (END1 - END2)/2^{12} + END1$$

where $NDATA(i)$ is the converted control data for the i-th rotational axis of the line robot, $END1$ and $END2$ are the minimum and maximum angles of the i-th rotatioanl axis of the line robot.

* * * * *